(12) United States Patent
Kuniavsky et al.

(10) Patent No.: US 8,604,908 B1
(45) Date of Patent: Dec. 10, 2013

(54) ARTICLE STORAGE SYSTEM WITH CLOSELY-COUPLED, ARTICLE-SPECIFIC DISPLAY

(75) Inventors: Michael Kuniavsky, San Francisco, CA (US); Tod E. Kurt, Pasadena, CA (US)

(73) Assignee: ThingM Corporation, San Francisco, CA (US)

( * ) Notice: Subject to any disclaimer, the term of this patent is extended or adjusted under 35 U.S.C. 154(b) by 0 days.

(21) Appl. No.: 12/009,141

(22) Filed: Jan. 15, 2008

(51) Int. Cl.
*G05B 19/00* (2006.01)

(52) U.S. Cl.
USPC ......... 340/5.92; 340/6.1; 340/6.14; 340/10.1; 340/10.2; 340/10.3; 340/10.4; 340/10.5; 340/10.6; 340/572.1; 340/572.2; 340/572.3; 340/572.4; 340/572.5; 340/572.6; 235/375; 235/376; 235/377; 235/378; 235/379; 235/380; 235/381; 235/382; 235/383; 235/384; 235/385

(58) Field of Classification Search
USPC ............ 340/5.92, 10.1–10.6, 572.1–572.935, 340/375–385, 572.9; 235/375–385
See application file for complete search history.

(56) References Cited

U.S. PATENT DOCUMENTS

| | | | | |
|---|---|---|---|---|
| 4,961,533 | A * | 10/1990 | Teller et al. | 177/25.19 |
| 5,721,531 | A * | 2/1998 | Garver et al. | 340/8.1 |
| 5,936,527 | A * | 8/1999 | Isaacman et al. | 340/572.1 |
| 6,127,928 | A * | 10/2000 | Issacman et al. | 340/572.1 |
| 6,339,762 | B1 * | 1/2002 | Powell | 705/14.1 |
| 6,397,334 | B1 * | 5/2002 | Chainer et al. | 713/176 |
| 6,714,121 | B1 * | 3/2004 | Moore | 340/10.3 |
| 6,752,321 | B1 * | 6/2004 | Leaming | 235/492 |
| 6,791,452 | B2 * | 9/2004 | Fletcher et al. | 340/10.6 |
| 7,015,811 | B2 * | 3/2006 | Decker et al. | 340/539.22 |
| 7,042,358 | B2 * | 5/2006 | Moore | 340/572.1 |
| 7,053,775 | B2 * | 5/2006 | Moore | 340/572.1 |
| 7,221,276 | B2 * | 5/2007 | Olsen et al. | 340/572.1 |
| 7,598,869 | B2 * | 10/2009 | Kumagai et al. | 340/572.1 |
| 7,605,547 | B2 * | 10/2009 | Ng | 315/294 |
| 7,701,348 | B2 * | 4/2010 | Kim | 340/572.4 |
| 7,737,855 | B2 * | 6/2010 | Rubinstein | 340/572.4 |
| 7,750,791 | B2 * | 7/2010 | Grego | 340/10.2 |
| 7,808,367 | B2 * | 10/2010 | Moore | 340/10.3 |
| 7,878,350 | B2 * | 2/2011 | Ramoundos | 215/230 |
| 7,961,104 | B2 * | 6/2011 | Bodin et al. | 340/572.1 |
| 8,009,864 | B2 * | 8/2011 | Linaker et al. | 382/103 |
| 8,222,996 | B2 * | 7/2012 | Smith et al. | 340/10.1 |
| 8,269,605 | B2 * | 9/2012 | Moore | 340/8.1 |
| 8,339,029 | B2 * | 12/2012 | Kim et al. | 313/498 |
| 2002/0190845 | A1 * | 12/2002 | Moore | 340/10.3 |
| 2002/0196146 | A1 * | 12/2002 | Moore | 340/572.7 |
| 2003/0001725 | A1 * | 1/2003 | Moore | 340/10.3 |

(Continued)

*Primary Examiner* — George Bugg
*Assistant Examiner* — Paul Obiniyi
(74) *Attorney, Agent, or Firm* — Jeffrey Schox

(57) ABSTRACT

Logic is included in a piece of active storage furniture such that the active storage furniture integrates articles stored thereby into a representation of information about those articles. The logic includes (i) sensors to identify individual articles stored by the furniture and respective locations of the articles and (ii) display elements capable of incorporating selected individual ones of the articles as separate and individual components of a collective representation of information about the selected articles. In response to queries about the articles, the articles themselves are integrated into a representation of information about the articles. For example, a wine rack includes RFID and LEDs in each of a number of storage cells or cubbies and illuminates each cubby according to information about the wine stored in the cubby in response to a query for such information (e.g., show me all wine color-coded by region).

17 Claims, 4 Drawing Sheets

(56) References Cited

U.S. PATENT DOCUMENTS

| | | | |
|---|---|---|---|
| 2003/0001726 A1* | 1/2003 | Moore | 340/10.3 |
| 2003/0206095 A1* | 11/2003 | Chaloner et al. | 340/10.4 |
| 2005/0206520 A1* | 9/2005 | Decker et al. | 340/539.22 |
| 2006/0022824 A1* | 2/2006 | Olsen et al. | 340/572.1 |
| 2006/0082440 A1* | 4/2006 | Glaser et al. | 340/5.91 |
| 2006/0109083 A1* | 5/2006 | Rathus et al. | 340/10.1 |
| 2006/0113369 A1* | 6/2006 | Taylor et al. | 235/375 |
| 2006/0113370 A1* | 6/2006 | Taylor et al. | 235/375 |
| 2006/0113374 A1* | 6/2006 | Taylor et al. | 235/376 |
| 2007/0075831 A1* | 4/2007 | Grego | 340/10.1 |
| 2007/0257860 A1* | 11/2007 | Langer | 345/46 |
| 2007/0296595 A1* | 12/2007 | Moore | 340/572.7 |
| 2007/0296596 A1* | 12/2007 | Moore | 340/572.7 |
| 2008/0055084 A1* | 3/2008 | Bodin et al. | 340/572.1 |
| 2008/0147211 A1* | 6/2008 | Teller | 700/90 |
| 2008/0284604 A1* | 11/2008 | Rubinstein | 340/572.4 |
| 2009/0020601 A1* | 1/2009 | Woodbury et al. | 235/375 |
| 2009/0063306 A1* | 3/2009 | Fano et al. | 705/28 |
| 2009/0099943 A1* | 4/2009 | Bodin et al. | 705/28 |
| 2009/0167699 A1* | 7/2009 | Rosenblatt et al. | 345/173 |
| 2009/0231135 A1* | 9/2009 | Chaves et al. | 340/572.1 |
| 2010/0025359 A1* | 2/2010 | Wolberg | 215/329 |
| 2011/0166694 A1* | 7/2011 | Griffits et al. | 700/215 |

* cited by examiner

ARTICLE STORAGE SYSTEM WITH CLOSELY-COUPLED, ARTICLE-SPECIFIC DISPLAY

FIELD OF THE INVENTION

The present invention relates generally to ubiquitous computing products, to embedded computer system displays, and to furniture for storage of articles and—more specifically—to a display system for displaying characteristics of articles stored by storage furniture wherein the display system is embedded in the storage furniture.

BACKGROUND

Relevant information about some articles is often not obvious from the articles themselves, yet may be very important in making a good choice among them. This information often exists in databases or similar information stores, but it is difficult to access it at the moment a decision needs to be made.

Even when accessible, such information is often overwhelming, making useful comparison of information regarding available articles impracticable. Such is particularly true of collections of similar yet distinct articles, making distinctions between the articles not readily discernible.

For example, selecting a wine from a wine rack requires knowing a lot about each bottle of wine (which regions and varietals go particularly—or even just acceptably—well with a particular meal, which bottles carry which recommendations of experts, which bottles are currently considered ready to drink, etc.). Even when armed with such information, merely locating one or more bottles of wine with the desired characteristics can be a significant challenge in large wine cellars.

What is needed is a more tightly-coupled nexus between information about articles in a collection and the articles themselves.

SUMMARY OF THE INVENTION

In accordance with the present invention, logic is included in a piece of active storage furniture such that the active storage furniture integrates articles stored thereby into a representation of information about those articles. The logic includes (i) sensors to identify individual articles stored by the furniture and respective locations of the articles and (ii) display elements capable of incorporating selected individual ones of the articles as separate and individual components of a collective representation of information about the selected articles.

For example, a piece of active storage furniture can be a wine rack that includes a number of storage cells or "cubbies" for storing individual bottles of wine. The cubbies in turn include a sensor for identifying a bottle of wine stored in the cubby and a display element for presenting that piece of a collection representation of information corresponding to the particular bottle of wine stored in the cubby. One example of such a sensor is an RFID reader to read an RFID tag affixed to the bottle of wine. One example of such a display element is a set of red, green, and blue LEDs that are collectively controlled to produce any of a wide variety of colors, color patterns, and/or blinking patterns. The LEDs are positioned toward the back of the cubbies to illuminate, not only the entire cubby, but the bottle stored therein as well.

Information regarding the wines stored in the wine rack is accumulated into a database that associates such information with the respective RFID tags affixed to the respective bottles. Such information can be provided manually by a local user and/or collected from remote sources through a wide area network such as the Internet.

Knowing the cubby in which each bottle of wine is stored by the wine rack and being able to control a display characteristic effected by each cubby individually, information about multiple bottles of wine can be displayed at one a mosaic of colors and patterns, thereby integrating the bottles of wine themselves into a representation of information about the bottles of wine.

The result is a very useful and intuitive conversation between the user and the wine rack: "Show me my wines by region. Show me only the region of Napa Valley. Show those wines by price categories. Show me those wines in the medium price category by varietal." The colors and/or patterns change in response to each query and the user immediately knows which wine to select and where it is.

DETAILED DESCRIPTION

Figure 1:
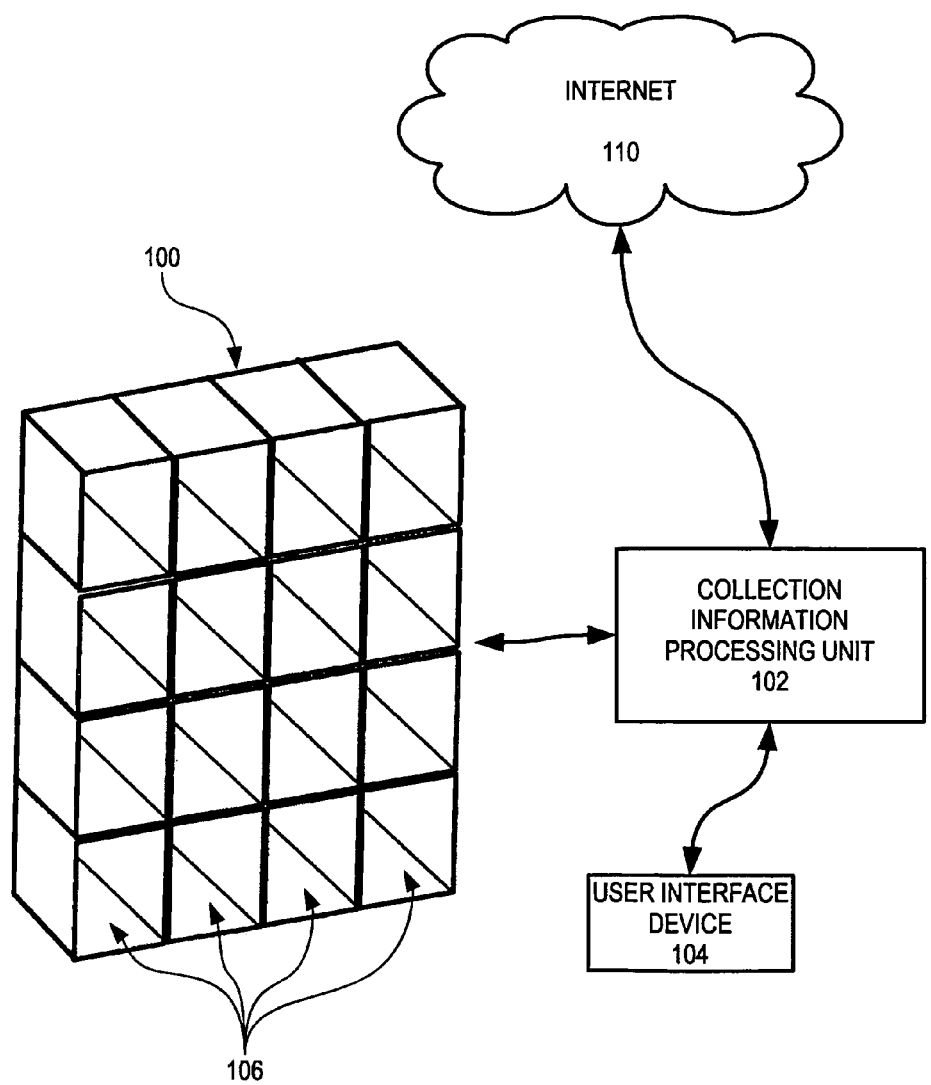
FIG. 1 is a block diagram showing an active wine rack and system in accordance with the present invention.

In accordance with the present invention, active storage furniture 100 (FIG. 1) uses articles stored therein as integral components of display of information about the articles themselves.

In this illustrative embodiment, the articles are bottles of wine and active storage furniture 100 is a wine rack. Accordingly, active storage furniture 100 is sometimes referred to herein as wine rack 100.

Wine rack 100 includes a number of cubbies 106 into each of which one bottle of wine can be stored. Thus, in effect, each of cubbies 106 defines a discrete location at which a single bottle of wine can be stored. Such facilitates identification and location of each bottle of wine of a collection in a manner described more completely below. While wine rack 100 shows sixteen (16) cubbies for storage of up to sixteen (16) bottles of wine, it should be appreciated that wine rack 100 can have fewer or more (many more) than sixteen (16) cubbies. In fact, as the number of cubbies 106 is increased to hundreds of thousands, the advantages realized by wine rack 100 become very important.

Each of cubbies 106 includes, against a back wall (not shown), an active display component 302 (FIG. 3), which is described more completely below. Briefly, each display component 302 includes a sensor 304 to sense the presence of, and identify, a particular bottle of wine and a display element 306 to associate a user-perceptible display effect with the bottle of wine. In this illustrative embodiment, display element 306 includes a red LED 308R, a green LED 308G, and a blue LED 308B to illuminate a corresponding one of cubbies 106 with any of a number of colors.

Examples of information displays producible by wine rack 100 are shown in FIGS. 5-8. In response to a query to show wines categorized by region, wine rack 100 illuminates cubbies storing bottles of wine with colors corresponding to the region from which each bottle of wine hails. In this illustrative example, wines hailing from Napa Valley in California are illuminated in magenta, wines hailing from the Bordeau region of France are illuminated in cyan, wines hailing from Italy are illuminated in green, and so on. The user has immediate, intuitive access to all information about wines stored in wine rack 100 without requiring any translation from database query results stored in a conventional representation (e.g., textually) to identification of individual bottles of wine or painstakingly careful, sorted, organized, and/or labeled storage of bottles within wine rack 100.

Figure 6:
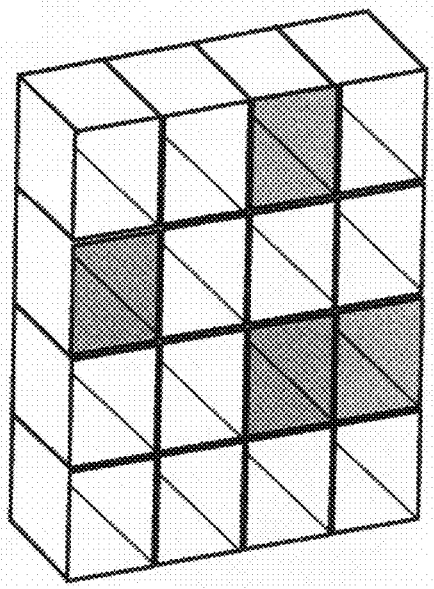

In FIG. 6, the user has asked for display of a subset of the previous set of results, asking that only wines hailing from Napa Valley of California be identified. Wines hailing from elsewhere are no longer illuminated by wine rack 100.

Figure 7:
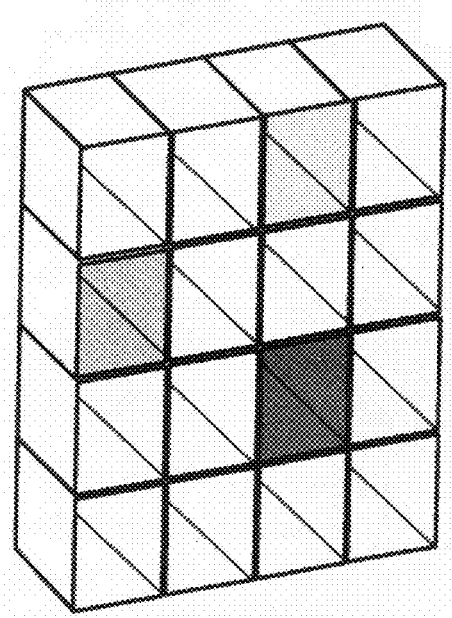
Figure 8:
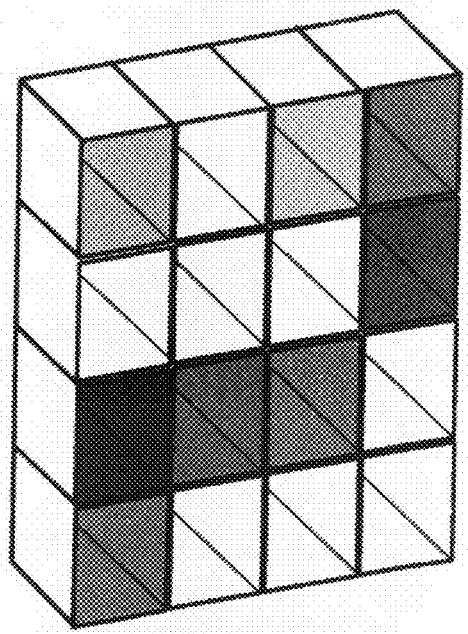

In FIG. 7, the user has asked to see price categories of the currently displayed wines. In response, wine rack 100 illuminates each of the wines that were illuminated in FIG. 5 with a color corresponding to a price category.

Even in a wine rack with only sixteen (16) cubbies, the user can select precisely the perfect wine in seconds with just a few thoughts about the type of wine to select. Of particular importance is the natural, intuitive manner in which the user receives the information—the queries are generally of the form "show me . . . " and, in response, the user is shown, literally and directly.

The user's experience contrasts sharply with conventional methods of locating a wine of interest. One conventional method is the trial-and-error method of pulling one bottle from its cubby at a time and looking at the label and/or price tag. Even with the simple, progressive narrowing query illustrative in FIGS. 5-7, "mental notes" are notoriously ill-suited for recording members of successively smaller sub-collections until a wine is selected. Such often requires multiple iterations of pulling each bottle from a conventional, passive wine rack.

Even when armed with information pulled from a computerized database, finding the wine in a conventional, passive wine rack involves a trial-and-error pulling of wine bottles from the rack (e.g., is this bottle the 2000 Harlan Estate Cabernet Sauvignon or not?"). Regardless of the computing power behind selecting a bottle of wine, the translation of information representing a selected wine to physical identification of a bottle of the selected wine is still—in conventional systems—a manual process.

Driving the display of wine rack 100 (FIG. 1) is a collection information processing unit 102. Collection information processing unit 102 is a general purpose computer programmed and/or configured (i) to store, manage, and process information about wine entered by the user through a user interface 104 and/or retrieved from other information sources, e.g., through the Internet 110; (ii) to store, manage, and process information about individual bottles of wine stored in wine rack 100; and (iii) to respond to queries of the user entered through user interface 104, producing a responsive display through wine rack 100 and user interface 104.

In this illustrative embodiment, collection information processing unit 102 is physically integrated into wine rack 100 so as to be invisible to the user, and user interface 104 is a portable, handheld computer (a Nokia 770 Web Tablet, to be precise) to allow the user to carry a full, feature-rich graphical user interface experience in her hand. Collection information processing unit 102 and user interface device 104 communicate with one another wirelessly—through any of the 802.11 wireless networking protocols and/or through Bluetooth wireless inter-device communications.

It should be appreciated that the allocation of functions between collection information processing unit 102 and user interface device 104 is largely arbitrary. Many of the functions of collection information processing unit 102, described more completely below, can be implemented within user interface device 104. In fact; all functionality of collection information processing unit 102 but the direct control of, and interaction with, active display components (e.g., active display component 302, FIG. 3) of wine rack 100 can be implemented by user interface device 104. The entirety of user interface device 104 can be implemented within collection information processing unit 102. For example, a touch-sensitive screen directly attached to, and integrated with, wine rack 100 can provide the user with a graphical user interface by which to browse information regarding wines generally and those stored in wine rack 100. Alternatively, collection information processing unit 102 can implement a speech-based user interface, incorporating known speech-to-text and text-to-speech methods. In this speech-based user interface, the user literally and orally asks to be shown and, in a very literal and direct sense, is shown. The user's experience is exactly that of speaking to wine rack 100 and observing wine rack 100 itself respond to the spoken request.

It is preferred that as little of the computing hardware as possible is noticeable to the user. Preferably, the user perceives herself to be communicating directly with wine rack 100. While collection information processing unit 102 performs a useful function as described herein, seeing collection information processing unit 102 itself does not directly enhance the user's experience in selecting a bottle of wine from wine rack 100.

Figure 2:
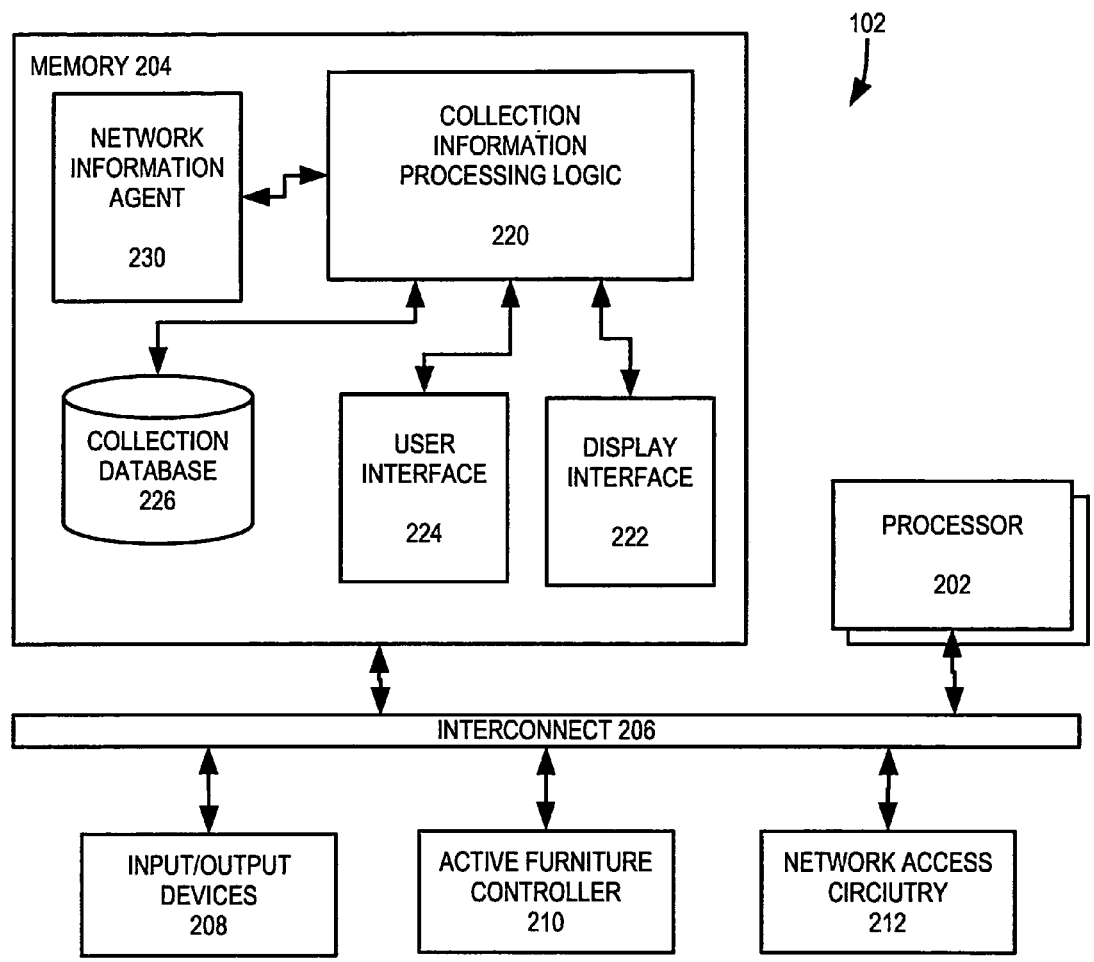
FIG. 2 is a block diagram of a collection information processing unit of FIG. 1 in greater detail.

FIG. 2 illustrates the general architecture of collection information processing unit 102. One or more processors 202 (collectively referred to herein as "processor 202") retrieves computer instructions and data from memory 204 through an interconnect 206 and executes the computer instructions, operating on the data if directed to do so by the computer instructions. In many instances, interconnect 206 is one or more buses. Memory 204 can include, for example, any of a number of types of random access memory (RAM, volatile or otherwise), readonly memory (ROM, programmable or otherwise) and persistent storage devices such as magnetic and optical disks.

Collection information processing unit 102 can also include input and/or output devices 208 such as user input devices such as keyboards, pointing devices like mice, trackballs, tablets, and touchpads, microphones, and cameras; display devices such as LCD displays, video projectors, printers, and loudspeakers; and peripheral data storage devices. User interface device 104 (FIG. 1) can connect to collection information processing unit 102 as one of input/output devices 208 (FIG. 2) through a Bluetooth inter-device wireless connection.

Collection information processing unit 102 includes active furniture controller 210 coupled to processor 202 and memory 204 through interconnect 206. Active furniture controller 210 receives and serves requests from processor 202 in accordance with instructions executing therein from memory 204 (i) to illuminate one or more individual cubbies 106 (FIG. 1)*of* wine rack 100 in respective, specific manners and (ii) to identify which, if any, bottle of wine is in each of one or more cubbies 106. The manner in which active furniture controller 210 serves such requests is described more completely below.

Collection information processing unit 102 includes network access circuitry 212 through which collection information processing unit 102 can communicate over a network, such as the Internet 110, a local area network (LAN), a public-switch telephone network (PSTN), and—in some embodiments—to user interface device 104.

Memory 204 stores collection information processing logic 220, a display interface 222, a user interface 224, a collection database 226, and a network information agent 230. Collection information processing logic 220, display interface 222, user interface 224, and network information agent 230 are each all or part of one or more computer processing executing in processor 202 from memory 204. Collection database 226 is a database stored in memory 204.

Collection information processing logic 220 defines the overall, general behavior of collection information processing unit 102. Such behavior encompasses primarily maintaining information about articles of a collection stored in wine rack 100 in collection database 226 and responding, to queries for such information received from user interface device 104 and responding to such queries by controlling the collective display presented by wine rack 100.

Display interface 222 is the API (application programming interface) by which collection information processing logic 220 interacts with active furniture controller 210 to thereby determine which bottles of wine are current stored in which respective cubbies 106 (in a manner described below) and to thereby control the collective display presented by wine rack 100.

User interface 224 implements the interface by which collection information processing logic 220 interacts with the user through user interface device 104 and/or input/output devices 208. In this illustrative embodiment, user interface device 104 includes a touch-sensitive screen through which the user can compose a query of collection database 226. Prompts are displayed for the user on the touch-sensitive screen and physical pressing of the screen by the user generates data representing a particular location within the touch-sensitive screen touched by the user. User interface device 104 interprets user input gestures from such signals to compose a database query. Such interpretation and composition of database queries through a graphical user interface is conventional and well-known. Upon a user input gesture so directing, user input device 104 transmits a user-composed database query to collection information processing logic 220 through user interface 224.

User interface 224 also sends information to user interface device 104 to assist the user in interpreting the various colors and possibly other display characteristics of wine rack 100. In effect, the touch-sensitive screen of user input device 104 can serve as a legend of wine rack 100, e.g., associating textual descriptions of the characteristics with the various colors ("Napa Valley wines" juxtaposed with a small magenta box shape to show wines illuminated in magenta are from Napa Valley, for example).

Collection database 226 stores information about each and every article of the collection stored in active storage furniture 100—in this illustrative embodiment, about each and every bottle of wine stored in wine rack 100. The particular organization and types of information stored in collection database 226 is not particular important so long as the information is helpful to the user. A number of wine organization databases and accompanying database management programs currently exist, one example of which is the wineBOSS® cellar management application available from wineBOSS-.com. Except as otherwise noted herein, such conventional database organizations and management mechanisms are suitable for use with collection database 226.

Network information agent 230 requests and/or receives information about articles represented in collection database 226 through one or more networks, such as the Internet 110, on behalf of collection information processing logic 220. To the extent information about such articles is available through networks accessible to collection information processing unit 102, network information agent 230 can request and receive such information. For example, Wine.com, Inc. currently supports XML-formatted queries of its wine database and returns results in an RSS-compliant XML format. Network information agent 230 can be configured to periodically query one or more such remote databases for information about the particular wines stored in wine rack 100 and to provide any collected responsive information to collection information processing logic 220 for storage in collection database 226.

In some embodiments, network information agent 230 receives information initiated remotely, e.g., from friends, acquaintances, and/or experts, about wines represented in collection database 226 according to a "push" paradigm. Network information agent 230 forwards any such received information to collection information processing logic 220 for storage in collection database 226.

As noted briefly above, wine rack 100 is both an input device and an output device. As an input device, wine rack 100 senses which bottles of wine are positioned within which respective cubbies 106. As an output device, wine rack 100 illuminates respective ones of cubbies 106 according to the particular bottles of wine stored in each an according to information about each bottle stored in collection database 226.

As described above, each of cubbies 106 includes, as part of its back wall, a display component 302 (FIG. 3), which in turn includes a sensor 304. In this illustrative embodiment, sensor 304 is an RFID (radio-frequency identifier) reader that reads an RFID tag 406 (FIG. 4) affixed to the bottom of each wine bottle 400 stored in wine rack 100 (FIG. 1). RFID tag 406 (FIG. 4) is affixed to bottle 400 on semi-circular card 404 adhered to the bottom of bottle 400. The semi-circular shape of card 404 allows one to insert a thumb into punt 402 of bottle 400 for serving of wine from bottle 400 in the proper, hoity-toity fashion.

Figure 3:
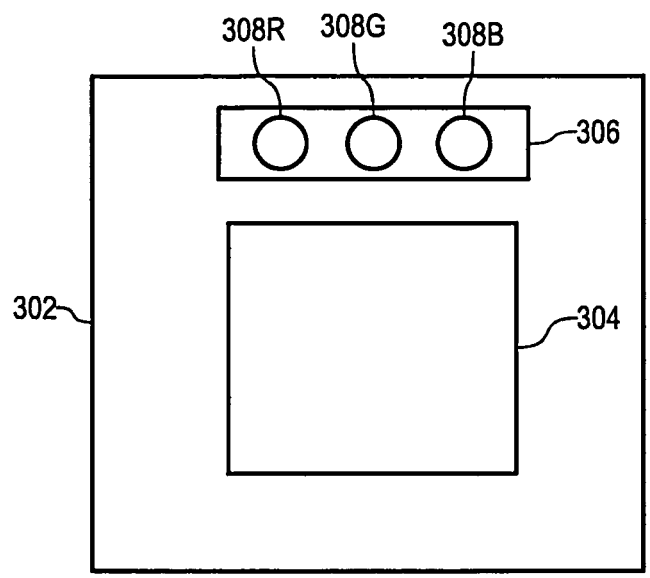
FIG. 3 is a block diagram of a display component of the wine rack of FIG. 1 in greater detail.
Figure 4:
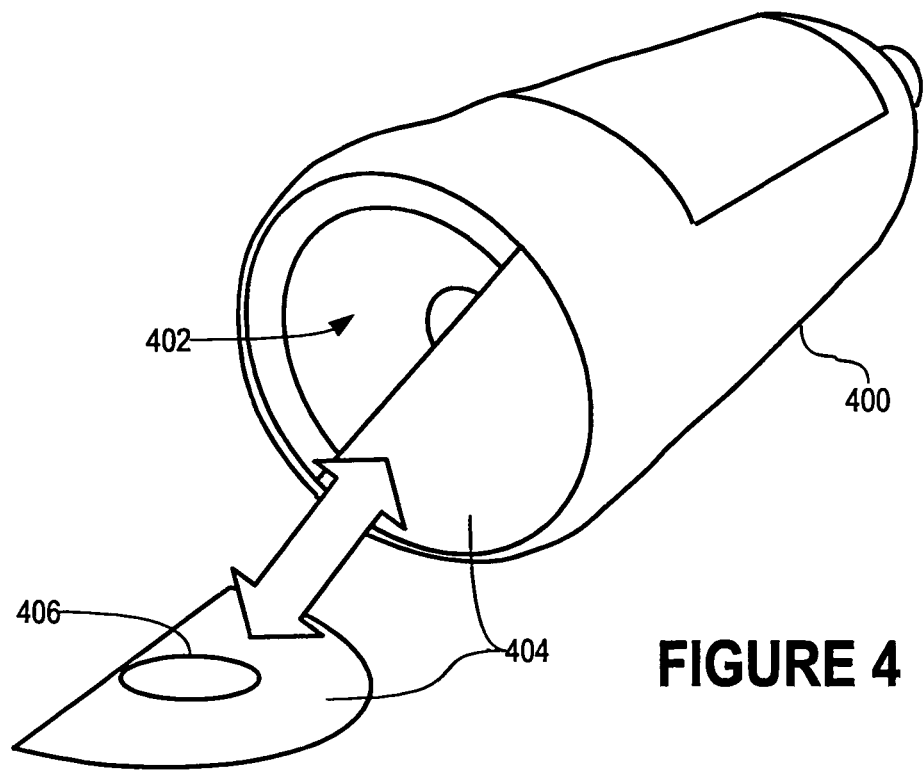
FIG. 4 is a perspective view of an RFID tag affixed to a wine bottle for subsequent identification in accordance with the present invention.
Figure 5:
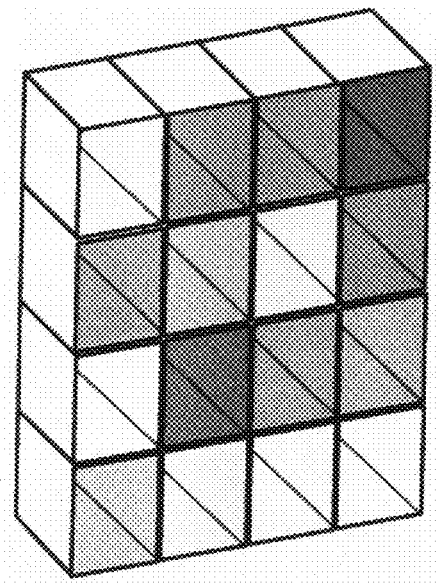
FIG. 5-8 shows illustrative examples of representations of information about bottles of wine integrating the bottles of wine (stored in the cubbies) themselves.

When bottle 400 is inserted into a particular cubby 106 of wine rack 100, RFID tag 406 (FIG. 4) is pushed into relatively close proximity with sensor 304 (FIG. 3). Sensor 304 can then sense and identify RFID tag 406 and send data through active furniture controller 210 and display interface 222 to collection information processing logic 220. In response, collection information processing logic 220 records the location of bottle 400 within wine rack 100 in collection database 226.

The original nexus between RFID tag 406 and information about bottle 400 stored in collection database 226 is provided by the user in this illustrative embodiment. When the user acquires bottle 400, the user enters information about the wine in bottle 400 into collection database 226 through user interface 224 and collection information processing logic 220 using conventional human-machine interface techniques involving physical manipulation of input/output devices 208 and/or user interface device 104. Included in the information entered by the user is data identifying RFID tag 406 such that collection information processing logic 220 can correlate information about bottle 400 entered by the user and data representing RFID tag 406 as sensed by sensor 304 and received from wine rack 100.

In an alternative embodiment, RFID tag 406 is writable and collection information processing logic 220 assigns a unique identifier to bottle 400 generally contemporaneously with entry of information about the wine in bottle 400 by the user and writes the unique identifier to RFID tag 406 for subsequent recognition by wine rack 100. The unique identifier is only required to be unique among identifiers assigned to other bottles by collection information processing logic 220. In one embodiment, collection information processing logic 220 causes user interface 224 to instruct the user to place card 404 in close proximity to an RFID writer (not shown) for writing of the unique identifier to RFID tag 406. Such an RFID writer can also read RFID tag 406 and can be used as an input/output device 208, allowing the user to do no more than present a bottle of wine as a database query of the form "show me more wines like this one."

In an alternative embodiment, sensor 304 can write the unique identifier to RFID tag 406 when bottle 400 is placed in the cubby in which sensor 304 is positioned. In this latter embodiment, the user can simply provide data representing the location of bottle 400, i.e., identifying one of cubbies 106, through user interface 224 to collection information processing logic 220. In response, collection information processing logic 220 causes sensor 302 to write the unique identifier to RFID tag 406 while inside wine rack 100. Preferably, collection information processing logic 220 prompts the user to both verify the location of bottle 400 and to confirm the desire to write to RFID tag 406 before doing so.

Reading of RFID tag 406 by sensor 304 can be somewhat challenging. In this illustrative embodiment, RFID tag 406 is a passive RFID tag. Currently available active and semi-passive RFID tags can be read from as far away as 100, or even 300, feet. With such long range, a single sensor could read RFID tags of each and every bottle in wine rack 100, making determination of the location of each of those bottles very difficult. Even passive RFID tags can be read as far away as 20 feet.

Reading RFID tags in all cubbies 106 of wine rack 100 to determine locations of individual bottles therein requires emitting RF, electromagnetic energy from each sensor 304 of each and every cubby 106 of wine rack in sufficient amounts to power each and every RFID tag such that each RFID can emit a responsive RF signal. The result is an RF cacophony in which many sensors receive responsive RF signals from multiple RFID tags and that some RF signals interfere with one another such that some responsive RF signals from RFID tags are received by no sensor, despite the close proximity of such sensors.

Collection information processing unit 102 take advantage of the fact that, in digital logic and computer time standards, wine bottles wait very patiently in cubbies 106 for what seems like an eternity. Thus, like a patient vintner, collection information processing unit 102 checks the contents of cubbies 106 one at a time, taking a very slow and methodical approach to determining which wines are in which cubbies.

In this illustrative embodiment, collection information processing unit 102 cause sensor 304 of only one of cubbies 106 to be active at any one time. Sensor 304 is calibrated to provide just enough electromagnetic energy to reliably power RFID tag 406 when within about 4-8 inches of sensor 304. In addition, lining the interior of each of cubbies 106 with a conductive, grounded screen can reduce overflow of electromagnetic energy from sensor 304 to a neighboring cubby. Accordingly, at most one RFID tag should respond to one sensor 304.

In large wine cellars, sensors of distant cubbies can be operated simultaneous without interference with one another.

In other words, sensors in different regions of a large wine cellar or of a large wine rack can be operated simultaneously so long as only one sensor from each region is operated at a time.

In some instances, one or more sensors in respective cubbies 106 of wine rack 100 can receive responsive RF signals from multiple RF tags. A number of techniques can be applied to resolve such ambiguity and identify the one RFID tag corresponding to the sensor. In one embodiment, sensor 304 detects receipt of multiple responsive RF signals and/or a collision of responsive RF signals and, in response thereto, reinitiates sensing RFID tags with less power. The process can be reiterated until only a single responsive RF signal is received.

In an alternative embodiment, sensor 304 measures the strength of the respective responsive RF signals and selects the RFID tag whose responsive RF signal is the strongest. In another alternative embodiment, sensor 304 measures the strength of the respective responsive RF signals and sends data representing the multiple responsive RF signals and their respective signal strengths. Armed with such information from multiple sensors from the various cubbies 106 of wine rack 100, collection information processing unit 102 can resolve ambiguity among signals received from neighboring sensors.

As an output device, wine rack 100 includes a number of cubbies 106, each of which in turn includes a display component such as display component 302 and, accordingly, a display element such as display element 306. Collection information processing unit 102 instructs each display element, such as display element 306, to display a particular color, expressed as levels of intensity with which LEDs 308R, 308G, and 308B are to be illuminated.

Collection information processing unit 102 can also specify other display characteristics to be rendered by display element 306. For example, one display characteristic can be a blinking pattern expressed as a timed sequence of toggling of the display of a particular color. The blinking can be abrupt or can fade in and out at a rate specified by collection information processing unit 102. Similarly, a display characteristic can be a timed sequence of colors. When not being used to communicate information responsive to a user's query, collection information processing unit 102 can control the display elements of wine rack 100 to produce some clever and/or entertaining displays. For example, each of cubbies 106 can blink so as to spell out the name or other information of the cubby's contents in Morse code—one at a time or all simultaneously. Wine rack 100 can be illuminated so as to display a binary clock, each of a number of cubbies 106 representing a single bit of the binary time representation. With enough cubbies 106, wine rack 100 can be illuminated as a large, dot-matrix-like, digital clock with each of a number of cubbies 106 serving as a pixel in a low-resolution, two-dimensional raster image. With even more cubbies 106, wine rack 100 can display a low-resolution analog clock in a similar fashion. Wine rack 100 can be illuminated as a low-resolution color mosaic art piece. Colors can gently and smoothly change from one to another and, in combination with color changes in adjacent cubbies, give the illusion of movement across the face of wine rack 100.

Thus, wine rack 100 is an effective input/output device that mostly appears to be a conventional piece of furniture.

To coordinate this level of control of the display components of wine rack 100 by collection information processing unit 102, each display component—e.g., display component 302 (FIG. 3)—includes digital logic that controls sensor 304 and display element 306 and that communicates with active furniture controller 210 (FIG. 2). In this illustrative embodiment, such digital logic is one or more integrated circuits—e.g., FPGAs and/or ASICs—and is connected to active furniture controller 210 by an inter-IC ($I^2C$) bus. In embodiments in which wine rack 100 includes more cubbies 106 than can be attached to a single $I^2C$ bus, multiple $I^2C$ busses are tiered in a hierarhical arrangement to effectively scale the capacity of the bus architecture.

The vocabulary of messages that can be communicated between active furniture controller 210 and display component 302 is modest. Active furniture controller 210 can send messages to display component 302 instructing display component 302 to (i) report its status; (ii) sense the contents of its cubby; and (iii) to change its display state. In response, display component 302 sends a reply message that, respectively, (i) reports its status; (ii) reports the contents of its cubby; or (iii) reports success or failure in changing its display state. The report of the status of display component 302 is used by collection information processing unit 102 to confirm proper of the display components of wine rack 100 at start-up and/or for diagnostic purposes. The report of the contents of the cubby of display component 302 can take any of the forms described above and can include predetermined data, e.g., null data, to indicate an empty cubby. The instruction to change display state specifies the display state in any of the forms described above—a collection of red, green, and blue intensities for LEDs 308R, 308G, and 308B, respectively, to specify a single color in RGB; a sequence of RGB colors with associated respective timestamps to specify a color sequence; or a color sequence with associated fade rates specified for each color transition. It should be appreciated that active furniture controller 210 can specify colors in colorspaces other than RGB, e.g, HSV, YUV, etc., and display component 302 can perform colorspace conversion to determine appropriate levels of intensity at which to illuminate LEDs 308R, 308G, and 308B.

By sending individual display characteristics to respective ones of cubbies 106, collection information processing unit 102 retains control over the collective display provided by display elements 306 of all cubbies 106. To coordinate display of similar bottles of wine, collection information processing unit 102 assigns a unique display characteristic to each of a number of categories and instructs each of cubies 106 containing a wine of a particular category to present the same display characteristic assigned to the category. Such enables the sorts of categorized display shown in FIGS. 5 and 6 as described above.

Much of the logic embodied in collection information processing unit 102 can be distributed among display components 302 of the respective cubbies 106. For example, display components 302 can be networked and can communicate with one another to collaboratively choose display characteristics for various categories of wine. Similarly, display components 302 can individually gather information about wines stored in their respective cubbies through a network-served database and can each store a complete wine record for their respective bottles. In such an embodiment, each display component 302 can independently respond to a query to show wines of a particular category—simply by reference to its own wine record and collaboratively, or previously, determined unique display characteristics for the particular category.

While the foregoing is a complete description of exemplary specific embodiments of the invention, additional embodiments are also possible. Thus, the above description should not be taken as limiting the scope of the invention, which is defined solely by the appended claims along with their full scope of equivalents.

What is claimed is:

1. An apparatus for storing articles of a collection, the apparatus comprising:
    a set of cubbies, each cubby in the set of cubbies configured to store an article of the collection;
    a set of sensors, each sensor in the set of sensors adjacent a particular cubby in the set of cubbies and configured to wirelessly receive data from an article arranged in the particular cubby;
    a collection database configured to store a characteristic of each of a set of characteristic types for each article in the collection;
    a set of display elements, each display element in the set of display elements coupled to a particular cubby in the set of cubbies and operable within a set of modes to illuminate the particular cubby, each mode in the set of modes defining a visual representation corresponding to a particular characteristic of a particular article arranged in the particular cubby;
    a user interface configured to receive queries from a user;
    a control logic configured to identify cubby locations corresponding to articles of the collection by polling sensors in the set of sensors, configured to set a first combination of modes of the set of display elements in response to a first query specifying a first characteristic type of articles of the collection, and configured to set a second combination of modes of the set of display elements different than the first combination of modes in response to a second query specifying a second characteristic type of articles of the collection, the first combination of modes intersecting the second combination of modes at a subset of the set of display elements.

2. The apparatus of claim 1, wherein the set of cubbies define a wine rack, each cubby in the set of cubbies configured to store an article comprising a wine bottle of the collection that comprises a wine collection.

3. The apparatus of claim 2, wherein each sensor in the set of sensors is arranged proximal a rear section of a corresponding cubby and is configured to receive identification information from a radio-frequency identifier tag arranged proximal a punt of a wine bottle arranged in the corresponding cubby.

4. The apparatus of claim 3, wherein each display element in the set of display elements comprises a light source coupled to a radio-frequency identifier tag arranged on a respective bottle, the control logic configured to control each display element in the set of display elements through a wireless signal transmitted to a particular display element from a corresponding sensor in the set of sensors.

5. The apparatus of claim 1, wherein each display element in the set of display elements is arranged in a particular cubby in the set of cubbies and is further configured to illuminate a particular article arranged in the particular cubby.

6. The apparatus of claim 1, wherein each sensor in the set of sensors comprises a radio-frequency identifier writer configured to write an identifier to a radio-frequency identifier tag arranged on an article arranged in a cubby in the set of cubbies, and wherein each sensor in the set of sensors is configured to wirelessly collect an identifier written to a radio-frequency identifier tag arranged on an article arranged in a corresponding cubby.

7. The apparatus of claim 6, wherein the control logic is configured to assign a unique identifier to an article when entered into the apparatus and to control a particular sensor in the set of sensors to write the unique identifier to a radio-frequency identifier tag arranged on the article in response to insertion of the article into a cubby corresponding to the particular sensor.

8. The apparatus of claim 7, wherein the user interface is further configured to receive, from a user, a characteristic of each characteristic type for the article, wherein the control logic is configured to associate the unique identifier with the characteristics, and wherein the collection database is configured to store the characteristics with a pointer to a unique identifier assigned to the corresponding article.

9. The apparatus of claim 1, wherein the user interface is configured to receive an identifier of a particular article, and wherein the collection database is configured to download a characteristic of each characteristic type for the particular article from the Internet based on the identifier.

10. The apparatus of claim 1, wherein each display element in the set of display elements comprises a multi-color light source configured to illuminate a corresponding cubby, wherein the control logic is configured to control a light color output of each display element according to the query, each light color output corresponding to a characteristic of a particular characteristic type specified by the query.

11. The apparatus of claim 10, wherein each cubby in the set of cubbies is configured to store an article comprising a wine bottle, wherein the user interface is configured to receive the query specifying a characteristic type comprising one of a vintage, a price category, a varietal, a region, and a drinking quality, and wherein the control logic is configured to control a light color output of each display element in the set of display elements in response to the query, each light color output correlated with a characteristic comprising one of a distinct vintage, a distinct price category, a distinct varietal, region, and a distinct drinking quality according to the characteristic type specified by the query.

12. The apparatus of claim 11, wherein the user interface is configured to receive the query specifying a plurality of characteristic types, and wherein the control logic is configured to control a light color output of each display element in the set of display elements according to the query, each light color output correlated with a combination of characteristics in the specified characteristic types.

13. The apparatus of claim 1, wherein the user interface comprises a touch display.

14. The apparatus of claim 1, wherein each display element in the set of display elements comprises a light source, and wherein the control logic is configured to control a blinking function of a display element in the set of display elements based on the query.

15. The apparatus of claim 1, wherein the control logic is configured to poll each sensor in the set of sensors sequentially.

16. The apparatus of claim 15, further comprising
a second set of cubbies, each cubby in the second set of cubbies configured to store an article of the collection,
a second set of sensors, each sensor in the second set of sensors coupled to a particular cubby in the second set of cubbies and configured to wirelessly receive data from an article arranged in the particular cubby,
a second set of display elements, each display element in the second set of display elements coupled to a particular cubby in the second set of cubbies and operable within a set of modes to illuminate the particular cubby in the second set of cubbies, each mode in the set of modes defining a visual representation corresponding to a particular characteristic of a particular article arranged in the particular cubby,
wherein the control logic is configured to sequentially poll each sensor in the second set of sensors and to simultaneously poll one sensor in the set of sensors and one sensor in the second set of sensors, and
wherein the control logic is further configured to set a first combination of modes of the second set of display elements in response to a first query specifying a first characteristic type of articles of the collection, and configured to set a second combination of modes of the second set of display elements different than the first combination of modes in response to a second query specifying a second characteristic type of articles of the collection, the first combination of modes intersecting the second combination of modes at a subset of the second set of display elements.

17. The apparatus of claim 16, wherein the one sensor in the set of cubbies and the one sensor in the second set of cubbies are arranged at a distance greater than a wireless range of a sensor in the set of sensors.

* * * * *